United States Patent [19]
Davies

[11] Patent Number: 5,415,071
[45] Date of Patent: May 16, 1995

[54] METHOD OF AND MEANS FOR PRODUCING MUSICAL NOTE RELATIONSHIPS

[76] Inventor: Peter M. Davies, 6 Pleasant Row, Woodford, Kettering, Northants, Great Britain, NN14 4HP UK

[21] Appl. No.: 761,775
[22] PCT Filed: Feb. 16, 1990
[86] PCT No.: PCT/GB90/00263
§ 371 Date: Aug. 14, 1991
§ 102(e) Date: Aug. 14, 1991
[87] PCT Pub. No.: WO90/09650
PCT Pub. Date: Aug. 23, 1990

[30] Foreign Application Priority Data
Feb. 17, 1989 [GB] United Kingdom ............... 8903672

[51] Int. Cl.6 ..................... G09B 15/02; G09B 15/00
[52] U.S. Cl. .......................... 84/471 SR; 84/485 SR
[58] Field of Search ........... 84/471 R, 471 SR, 479 R, 84/479 A, 483.1, 483.2, 485 R, 485 SR

[56] References Cited

U.S. PATENT DOCUMENTS

| | | | |
|---|---|---|---|
| 3,572,205 | 3/1971 | Scholfield | 84/474 |
| 3,592,099 | 7/1971 | Gibby | 84/473 |
| 3,677,130 | 7/1972 | Petreycik | 84/471 |
| 3,748,947 | 7/1973 | Frenoit | 84/485 |
| 3,752,031 | 8/1973 | Mohos | 84/471 |
| 3,791,254 | 2/1974 | Muller | 84/471 |
| 3,908,506 | 9/1975 | Leonard | 84/471 |
| 4,069,737 | 1/1978 | Andersson | 84/485 SR |
| 4,175,468 | 11/1979 | Whitlock | 84/485 SR |
| 4,677,893 | 7/1987 | Fahnestock | 84/473 |

FOREIGN PATENT DOCUMENTS

| | | |
|---|---|---|
| 2602957 | 10/1976 | Germany . |
| 2131592A | 2/1982 | United Kingdom . |
| 2119153A | 4/1982 | United Kingdom . |
| WO8810483 | 12/1988 | WIPO ............... 84/471 SR |

Primary Examiner—Michael L. Gellner
Assistant Examiner—Eddie C. Lee
Attorney, Agent, or Firm—Biebel & French

[57] ABSTRACT

In a method of and means for producing musical note relationships there is provided an array of staggered lines or rows (1) of symbols, in which each symbol represents a musical note. Each line (1) comprises a repeated series of twelve symbols forming a musical series of semitones known as a chromatic scale, and each line is staggered with respect to adjacent lines such that groups of the symbols which represent the same musical note relationship, such as intervals, scales, chords, etc, form the same visual configuration, for example diagonal configurations (6 to 9) or vertical configuration (14 to 19), at respective locations in the array. In one embodiment, a device including means bearing such an array may be used as a learning aid comprising two overlapping members slidably movable relative to each other. Alternatively the contact positions of a keyboard of a keyboard musical instrument or a fingerboard of a stringed musical instrument may be arranged in accordance with the array.

4 Claims, 23 Drawing Sheets

FIG. 9A

| C# | Bb | D | Eb | E | C# | F | F# | D | F | Ab | A |
|---|---|---|---|---|---|---|---|---|---|---|---|
| F# | Eb | G | Ab | A | F# | Bb | B | G | Bb | C# | D |
| B | Ab | C | C# | D | B | Eb | E | C | Eb | F# | G |
| E | C# | F | F# | G | E | Ab | A | F | Ab | B | C |

FIG. 9B

| Bb | B | C# | C | D | Eb | E | F | F# | G | Ab | A | Bb | B | C# | C | D | Eb | E |
|---|---|---|---|---|---|---|---|---|---|---|---|---|---|---|---|---|---|---|
| Eb | E | F | F# | G | Ab | A | Bb | B | C | C# | D | Eb | E | F | F# | G | Ab | A |
| Ab | A | Bb | B | C | C# | D | Eb | E | F | F# | G | Ab | A | Bb | B | C | C# | D |
| C# | D | Eb | E | F | F# | G | Ab | A | Bb | B | C | C# | D | Eb | E | F | F# | G |
| F# | G | Ab | A | Bb | B | C | C# | D | Eb | E | F | F# | G | Ab | A | Bb | B | C |
| B | C | C# | D | Eb | E | F | F# | G | Ab | A | Bb | B | C | C# | D | Eb | E |

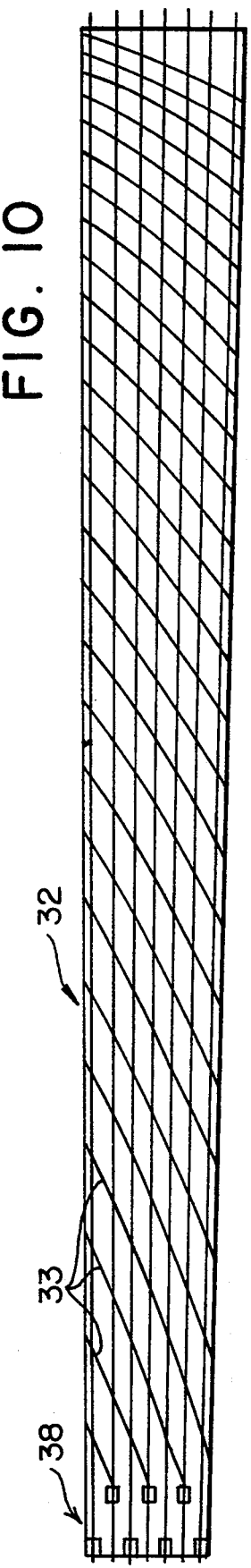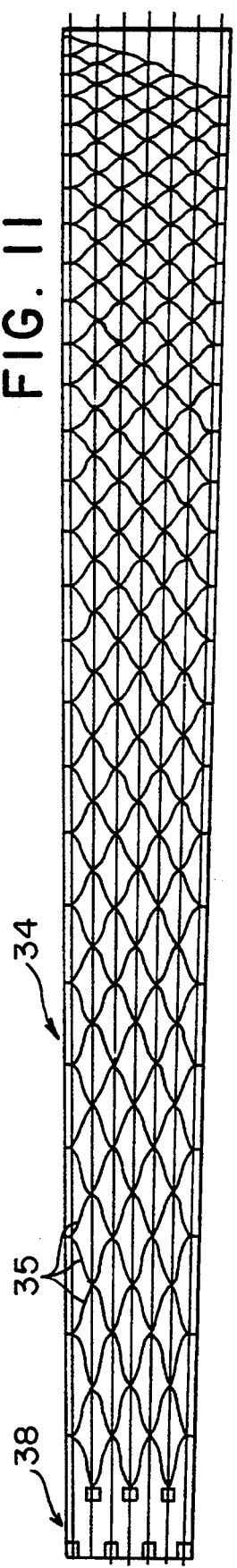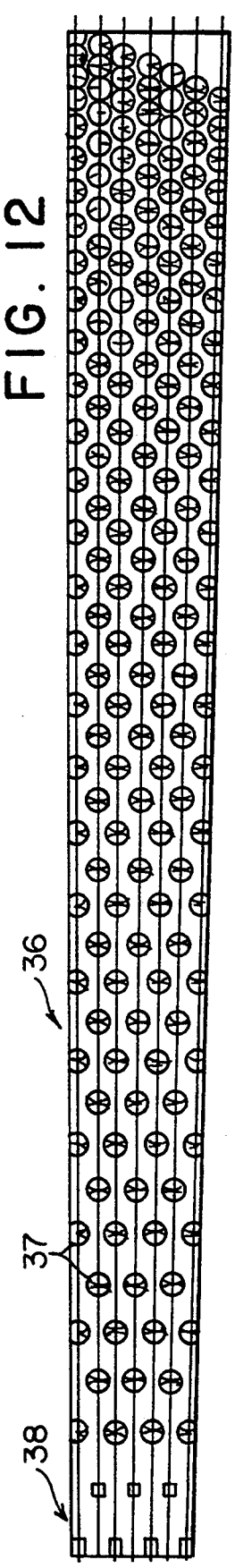

METHOD OF AND MEANS FOR PRODUCING MUSICAL NOTE RELATIONSHIPS

BACKGROUND OF THE INVENTION

This invention relates to a method of and means for producing musical note relationships, and in particular to such relationships which consist of groups of musical notes forming musical intervals, scales, chords, etc in different musical keys.

To become a competent musician, it is necessary to learn and remember all musical note relationships, whose interactions together form the rudiments of musical theory. Such note relationships are conventionally taught in an audible manner, with scant visual information to aid understanding. For those students who are naturally musically orientated, such learning may be relatively easy. However, for those students who are not so fortunate, it can prove to be extremely difficult to remember individual note relationships and understand how they are interconnected.

Furthermore, while all the note relationships are being learnt, it is necessary to learn how these are applied in the playing of a particular musical instrument. For example, it is necessary to learn all the finger positions on a keyboard of the piano or a fingerboard of a guitar, which must be used to make the instrument play the required note relationships in all musical keys. Not only are such finger positions generally different for different types of instrument, but they also vary from one key to another on any one instrument, so that the playing of each key has to be mastered separately.

SUMMARY OF THE INVENTION

It is an object of the present invention to provide a method of and means for producing musical note relationships which enables such relationships to be understood and learnt more easily than has been possible hitherto and which may also be used to simplify the playing of many musical instruments.

According to one aspect of the present invention, there is provided a method of producing musical note relationships comprising the steps of:

arranging a plurality of symbols each representing a musical note into an array, wherein groups of said symbols, which represent the same musical note relationship in different musical keys, form the same visual configuration at respective locations within the array, said array consisting of rows of said symbols, any given row being arranged relative to an adjacent row such that successive symbols of said given row each lies substantially between two successive symbols of said adjacent row, said successive symbols of each row representing the musical notes of a chromatic scale, and identifying the respective configurations thus formed for the musical note relationships, characterized in that, for each symbol of said given row which lies substantially between two successive symbols of said adjacent row, the two successive symbols represent notes which form musical intervals with the note represented by said symbol of a major third and minor third respectively.

According to a second aspect of the invention, there is provided a device for producing musical note relationships, the device comprising means bearing an array of symbols, each symbol representing a musical note and the symbols being arranged such that groups of said symbols, which represent the same musical note relationship in different musical keys, form the same visual configuration at respective locations within the array, said array consisting of rows of said symbols, any given row being arranged relative to an adjacent row such that successive symbols of said given row each lies substantially between two successive symbols of said adjacent row, said successive symbols of each row representing the musical notes of a chromatic scale, characterized in that, for each symbol of said given row which lies substantially between two successive symbols of said adjacent row, the two successive symbols represent notes which form musical intervals with the note represented by said symbol of a major third and minor third respectively.

The rows may be arranged in horizontal rows with the symbols arranged such that each semi-tone of a row is positioned between the fourth and fifth semi-tone in the row immediately above it when counting in a direction to the right from the same semi-tone in that row, this semitone being counted as the first, and is positioned between the fourth and fifth semi-tone in the row immediately below it when counting in a direction to the left from the same semi-tone in that row.

In this way, three clearly defined rows of notes, i.e. horizontal rows of semi-tones, diagonal rows of minor thirds and diagonal rows of major thirds are produced, which all cross one another at approximately 60°. All other intervals, scales, chords, etc., used in music theory appear, in particular configurations, at specific locations within the array in relation to every note.

According to a third aspect of the invention, there is provided a learning aid for producing musical note relationships, the learning aid comprising means bearing an array of symbols, each symbol representing a musical note and the symbols being arranged such that groups of said symbols, which represent the same musical note relationship in different musical keys, form the same visual configuration at respective locations within the array, and means for identifying the respective configurations thus formed for the musical note relationships, the array consisting of rows of said symbols, any given row being arranged relative to an adjacent row such that successive symbols of said given row each lies substantially between two successive symbols of said adjacent row, said successive symbols of each row representing the musical notes of a chromatic scale, characterized in that, for each symbol in said given row which lies substantially between two successive symbols of said adjacent row, the two successive symbols represent notes which form musical intervals with the note represented by said symbol of a major third and a minor third respectively.

According to a fourth aspect of the invention, there is provided a musical instrument comprising a plurality of contact positions each for use in generating an audible musical note, said contact positions being arranged in an array wherein groups of said contact positions which may be used to generate the same musical note relationship in different musical keys form the same visual configuration at respective locations within the array, said array consisting of rows of the contact positions, any given row (1) being arranged relative to an adjacent row such that successive contact positions of said given row each lies substantially between two successive contact positions of said adjacent row, the contact positions of each row being arranged such that successive contact positions generate a musical chromatic scale, characterized in that, for each contact position of said given row which lies substantially between two successive contact positions of said adjacent row, the two successive contact positions are for generating audible musical notes which form musical intervals with the musical note generated by the said contact position of a major third and minor third respectively.

The musical instrument may be for example a stringed instrument with the contact positions being defined by a number of strings tensioned across a fingerboard of the instrument. In another example, the instrument may be a keyboard instrument with the contact positions being defined by the keys of the keyboard.

The rows may be arranged in horizontal rows of semi-tones with the contact positions arranged such that each note of a line of semi-cones is positioned between the fourth and fifth note in the row of semi-tones immediately above it when counting in a direction to the right from the same note in that row, and is positioned between the fourth and fifth note in the row immediately below it when counting in a direction to the left from the same note in that row.

The present invention may be utilised in many different forms, for example written or printed charts, computer software, or mechanical devices such as slide rules, which can indicate the specific configurations, within the array, which provide the musical note relationships. Thus, as a learning aid, the present invention provides easy access to musical information which is often hard to absorb and understand in a conventional manner. The shifting frames of reference which characterise musical harmony are a constant source of confusion which the present invention clarifies by its symmetry. Furthermore, when applied to a musical instrument, it provides a way of positioning notes on a keyboard or fingerboard, for example, in such a way that the player of an instrument can easily see all the harmonic possibilities and play them with equal ability in all musical keys. The visual arrangements of the notes on these instruments clarifies the learning process and, because there is no bias towards a particular musical key, the present invention facilitates more flexible playing than on conventional instruments where up to twelve musical keys need to be learnt separately before flexible playing is possible.

BRIEF DESCRIPTION OF THE DRAWINGS

The invention will now be further described by way of example with reference to the accompanying drawings, wherein.

DESCRIPTION OF THE PREFERRED EMBODIMENTS

FIGS. 1 to 6 show a two-dimensional array of well known musical symbols, which each represent a musical note in known manner. The array consists of a number of horizontal rows, for example as shown by reference 1, with each row including repeated series of twelve symbols from A to G#/A♭, which each represent a musical note and together form a musical series of semi-tones, otherwise known as a chromatic scale, giving rise to twelve different musical keys. It can be seen that each note is placed between its major and minor third notes in the row immediately above it. For example, the note A in the second row from the top of the array is positioned between the notes C and C#/D♭ in the top row of the array. In other words, each note is placed between the fourth and fifth note in the adjacent row immediately above it, when counting in a direction to the right from the same note in that adjacent row, or is placed between the fourth and fifth note in the adjacent row immediately below it, when counting in a direction to the left from that same note in that adjacent row. In both cases, the same note in the adjacent row is counted as the first note. For example, note A in the second row from the top or the array is between the notes C and C#/D♭ in the top row, which are the fourth and fifth notes to the right of note A in the top row. Similarly, note A in the second row is also between the notes F#/G♭ and F in the third row of the array, which are the fourth and fifth notes to the left of note A in the third row.

Figure 1:
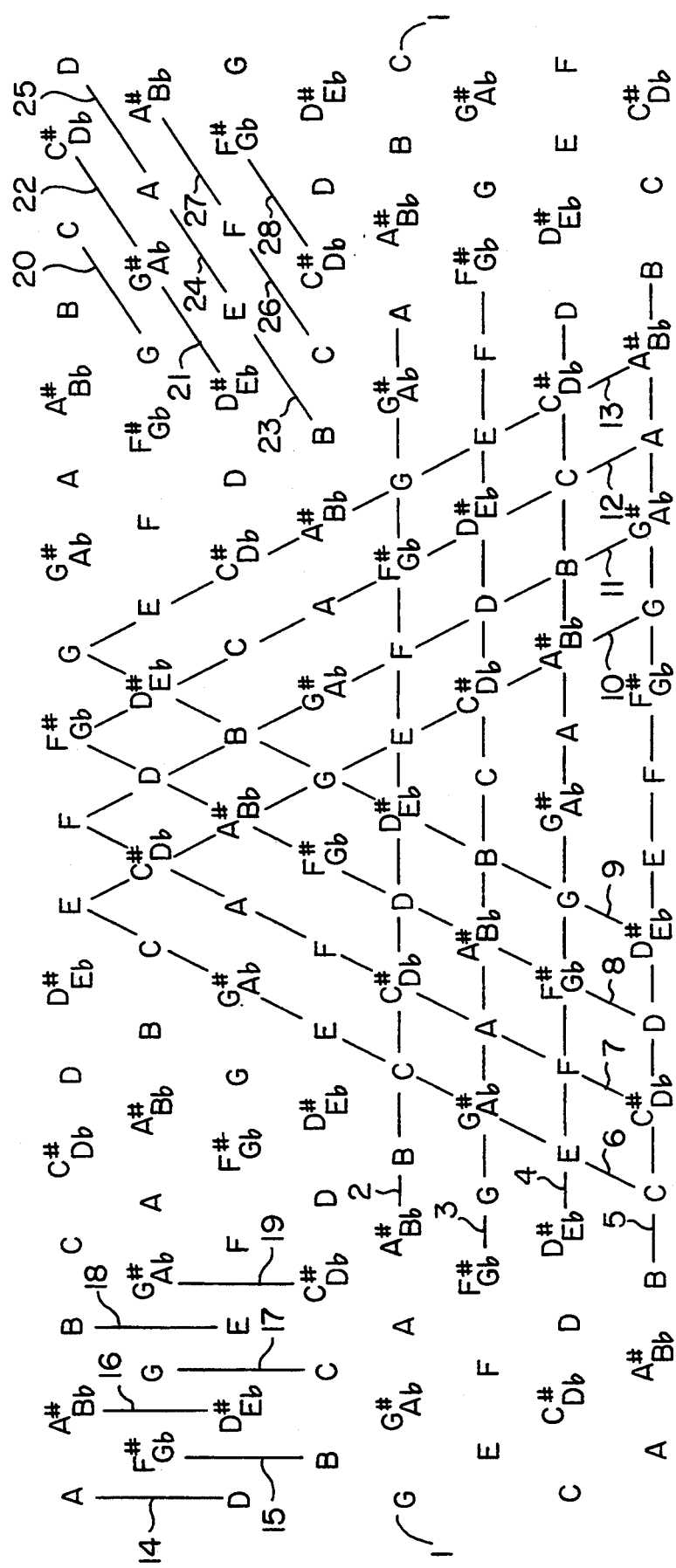
FIGS. 1 to 6 show an array of symbols, each representing a musical note and being arranged in accordance with one embodiment of the invention.

In FIG. 1, it can be seen that four horizontal configurations 2 to 5 respectively show four scales of semitones starting with the notes A#/B♭, F#/G/♭, D#/E♭, and B, respectively. Similarly, diagonal configurations 6 to 9, slanting to the right of the array determine major thirds starting with the notes C, C#/D♭, D, D#/E♭, respectively, and diagonal configurations 10 to 13 slanting to the left of the array determine minor thirds starting with the notes G, G#/A♭, A, A#/B/♭, respectively. Also, in FIG. 1, the vertical configurations 14 to 19 each show fifths from D to A, B to F#/G ♭, D#/E♭ to A#/B♭, etc, and the diagonal configurations 20 to 28 each show fourths from G to C D#/E♭ to G#/A♭ to C#/D♭, etc.

Figure 2:
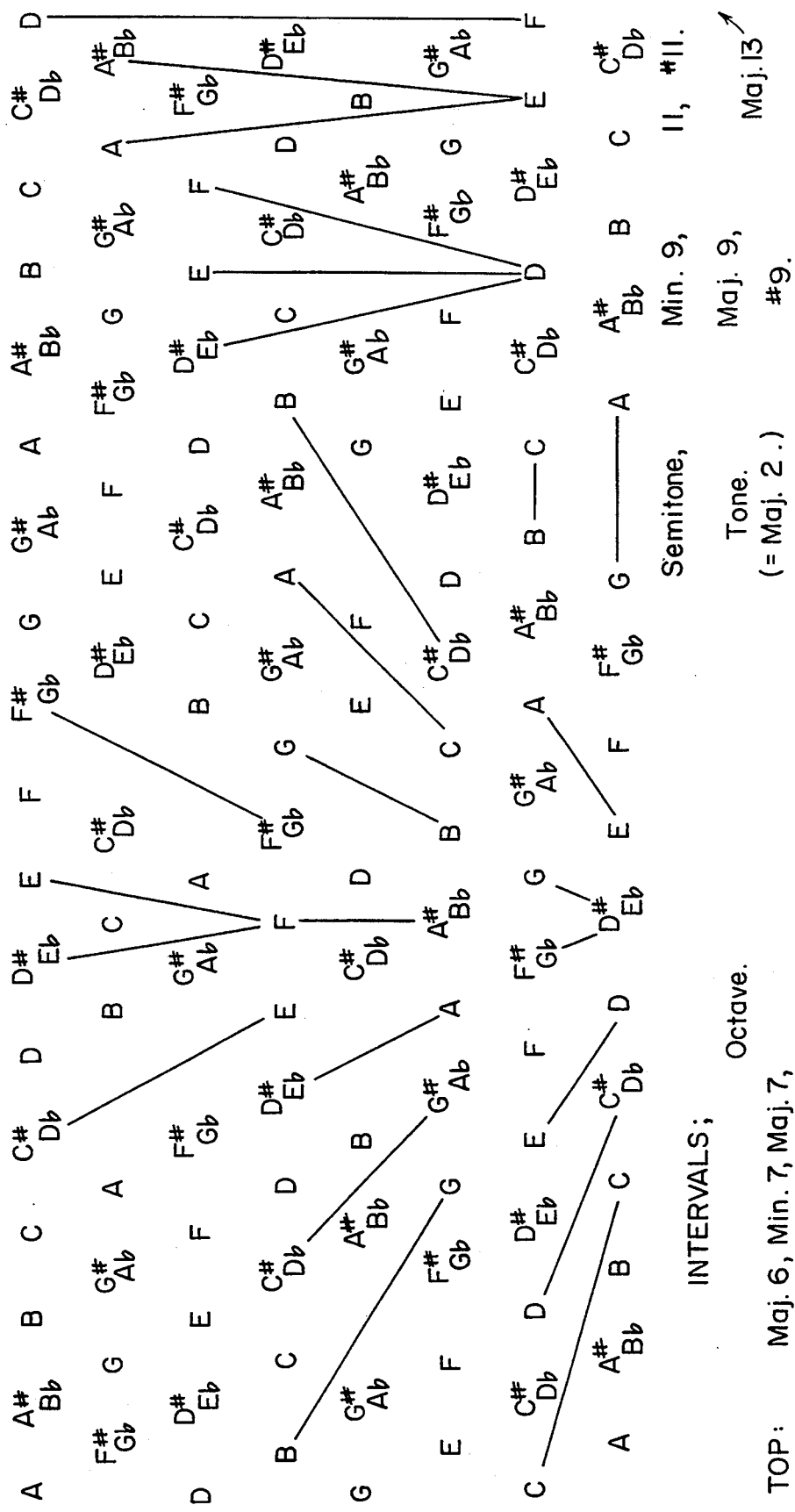
Figure 3:
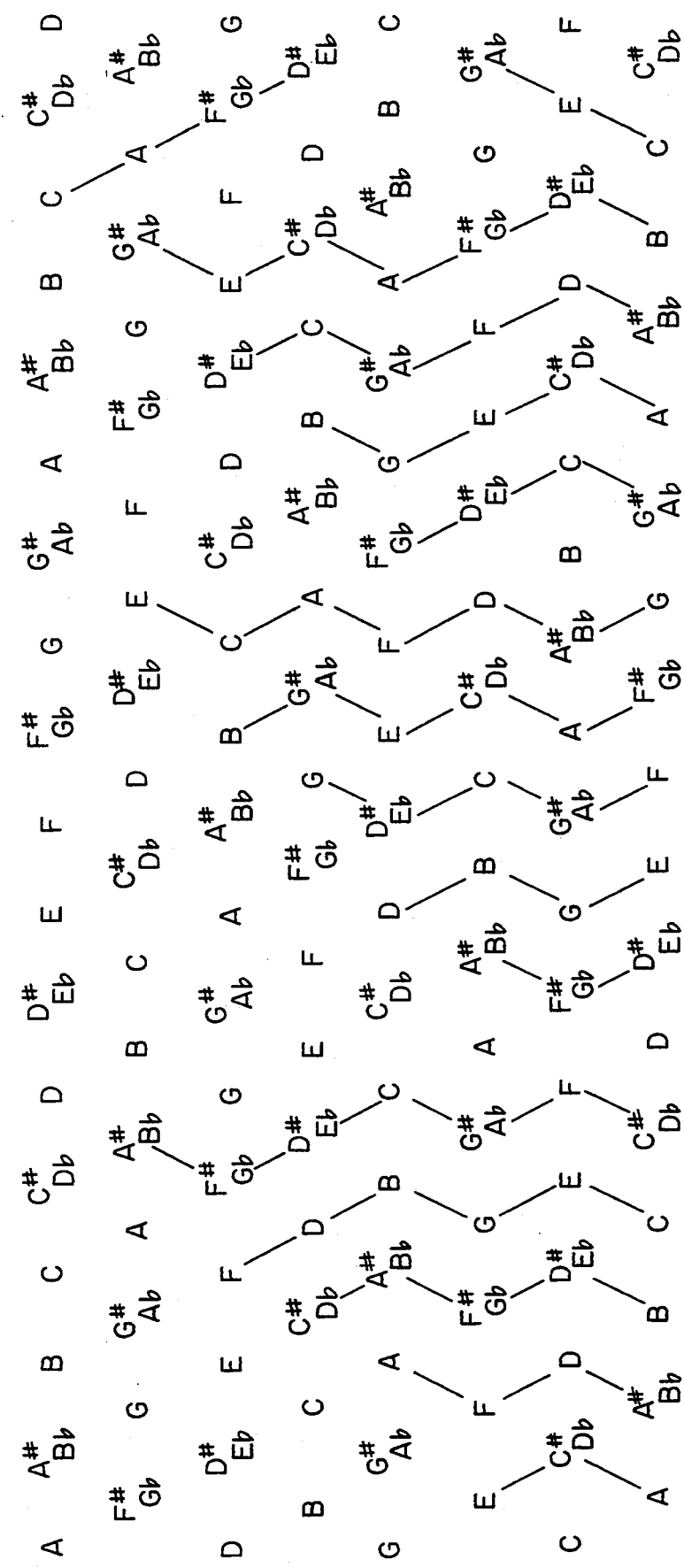
Figure 4:
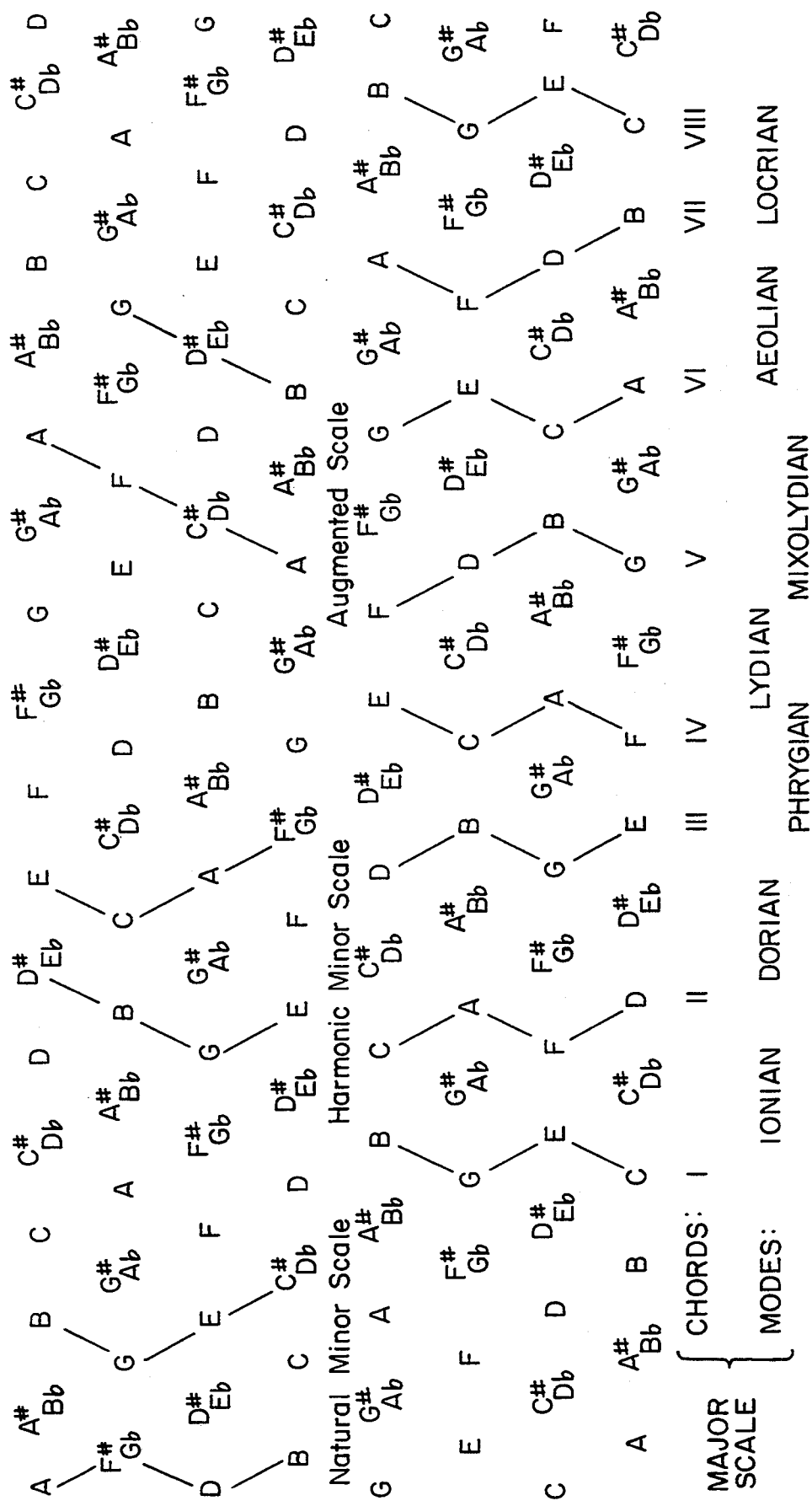

In a similar manner, FIG. 2 shows examples of interconnecting configurations within the array, which each determine a different musical interval. FIG. 3 shows examples of configurations, which determine chords in specific musical keys. In FIG. 4, the top half of the array shows examples of configurations, which respectively determine natural minor, harmonic minor, and augmented scales in specific musical keys. These configurations are each read in horizontal pairs from the bottom left of the configuration to top right, i.e. the harmonic minor scale in the key of E consists of E, F#/G♭, G, A, B, C, D#/E♭, E. The lower half of the array in FIG. 4 snows an example of a configuration forming a major scale with its seven modes and eight chords derived from this scale.

Figure 5:
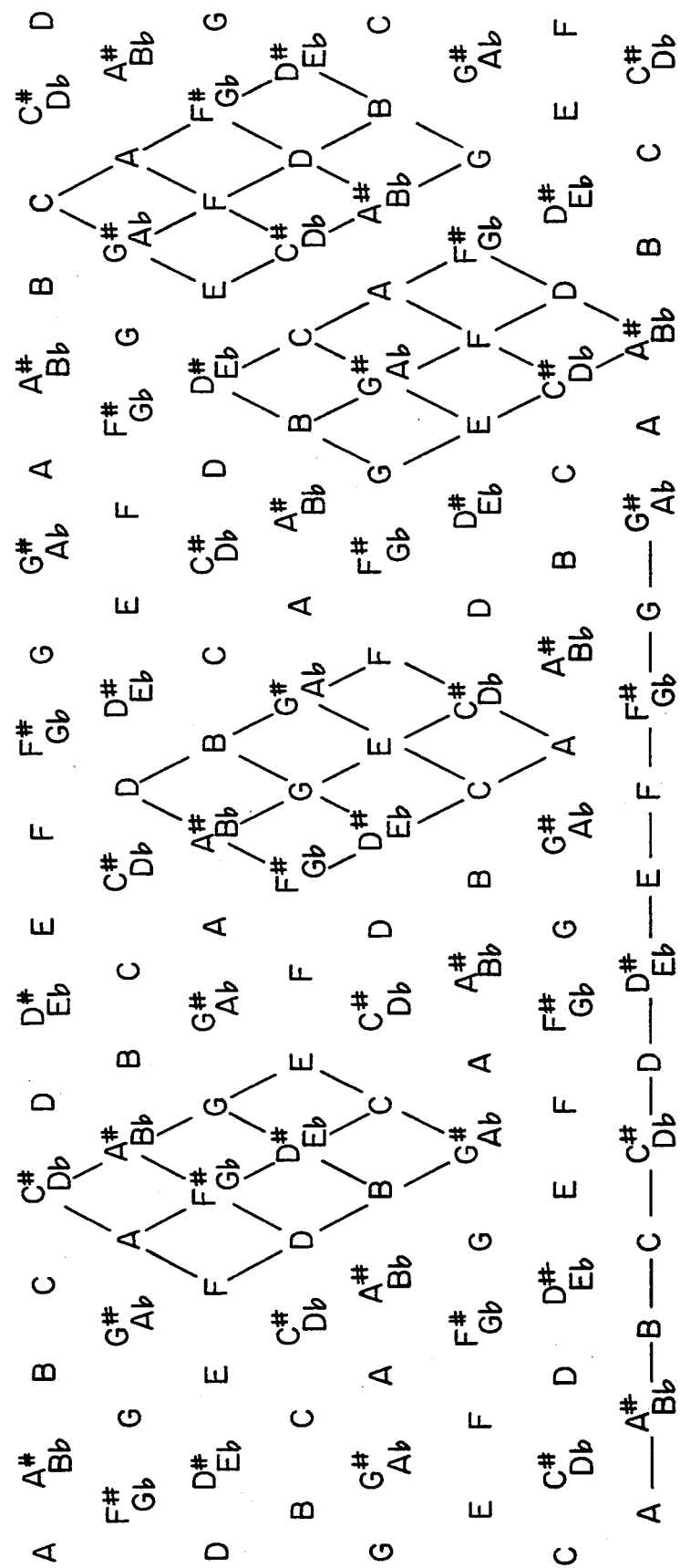

It can be seen from FIG. 5 that a configuration in the form of a parallelogram at any location within the array shows three diminished and four augmented chords in crossing rows of major and minor thirds, and every parallelogram thus formed contains the complete series of twelve semi-tones shown in the connected horizontal line at the bottom of the array in FIG. 5.

Figure 6:
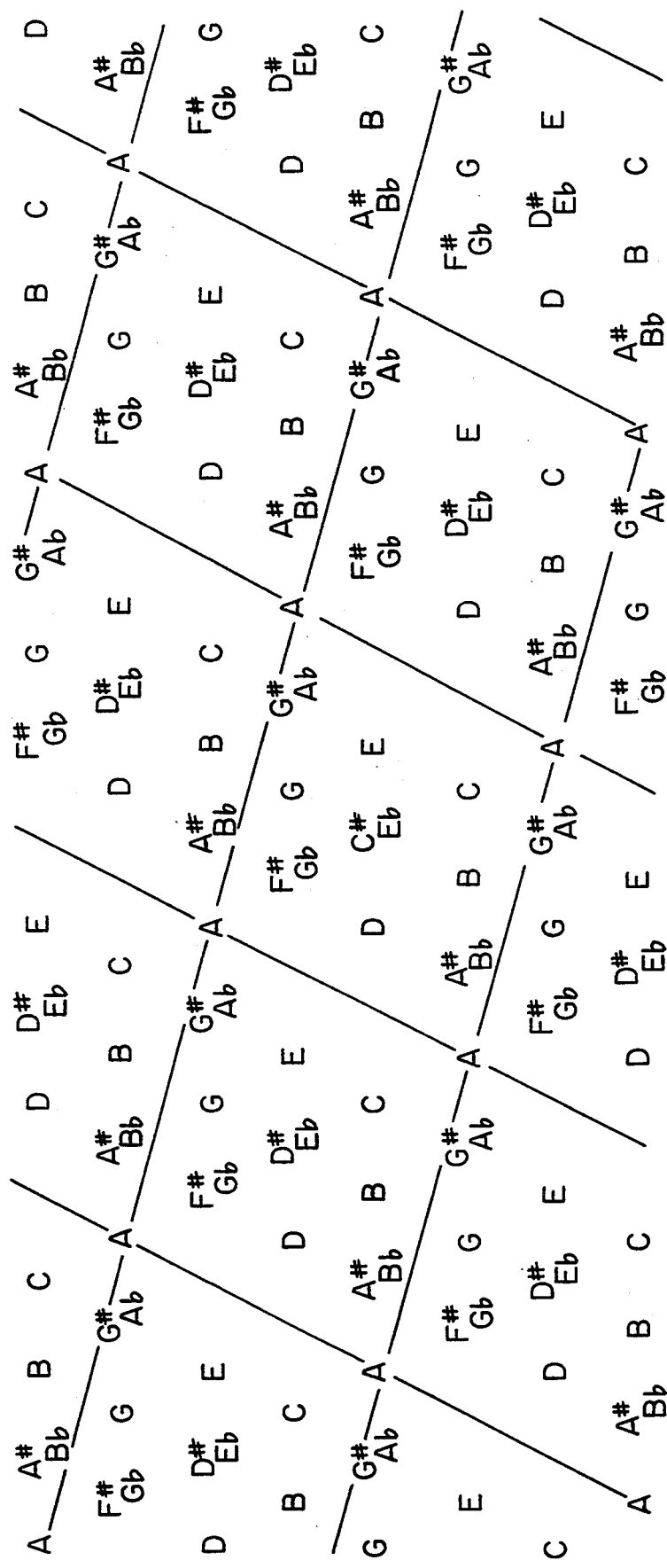

The configurations of FIG. 6 form connected unisons and octaves, which, for any given note, in this example: A, form a grid dividing the array into equal sections, each containing the same notes in the same positions.

In all of FIGS. 1 to 6, the geometrical configurations showing the musical note relationships are shown in particular musical keys as examples only. However, it can be envisaged that such configurations can be repeated at other specific locations within the array to determine a particular relationship in other musical keys. In theory, the number of notes in each row and the number of rows in the array are infinite. However, in practice the shape and dimensions of the array are determined by its particular application.

The array as shown in FIGS. 1 to 6 can be used in many different forms as, for example, an aid to learning the musical note relationships in all musical keys. For example, the array may be incorporated into:

1. Written or printed charts.
2. Pocket sized computers where the pressing of labelled buttons make particular configurations appear with the array being displayed on a computer screen in a fixed or scrolling form.
3. A teaching programme of music theory in disc or cassette form for use with home computers.
4. A programme which enables the keys of a computer keyboard to be used to sound notes arranged pitch in accordance with the invention.
5. A magic slate with the array printed on it, where the configurations can be drawn over the array to indicate the note relationships and then erased.
6. A musical slide rule, which can be double-sided, where the configurations provided on a transparent material, such as a cursor, move across a background array, to show intervals, scales and chords, etc. within the array. Alternatively, the array is provided on the movable transparent material and the configurations are provided on the background.
7. Musical instruction or demonstration on video tape recordings.

FIGS. 7 to 18 illustrate how the array can be applied to an electronic keyboard (FIGS. 7, 8 and 8a) or a fingerboard of a guitar (FIGS. 9 to 13) or a fingerboard of a bass guitar (FIGS. 14 to 18).

Figure 7A:
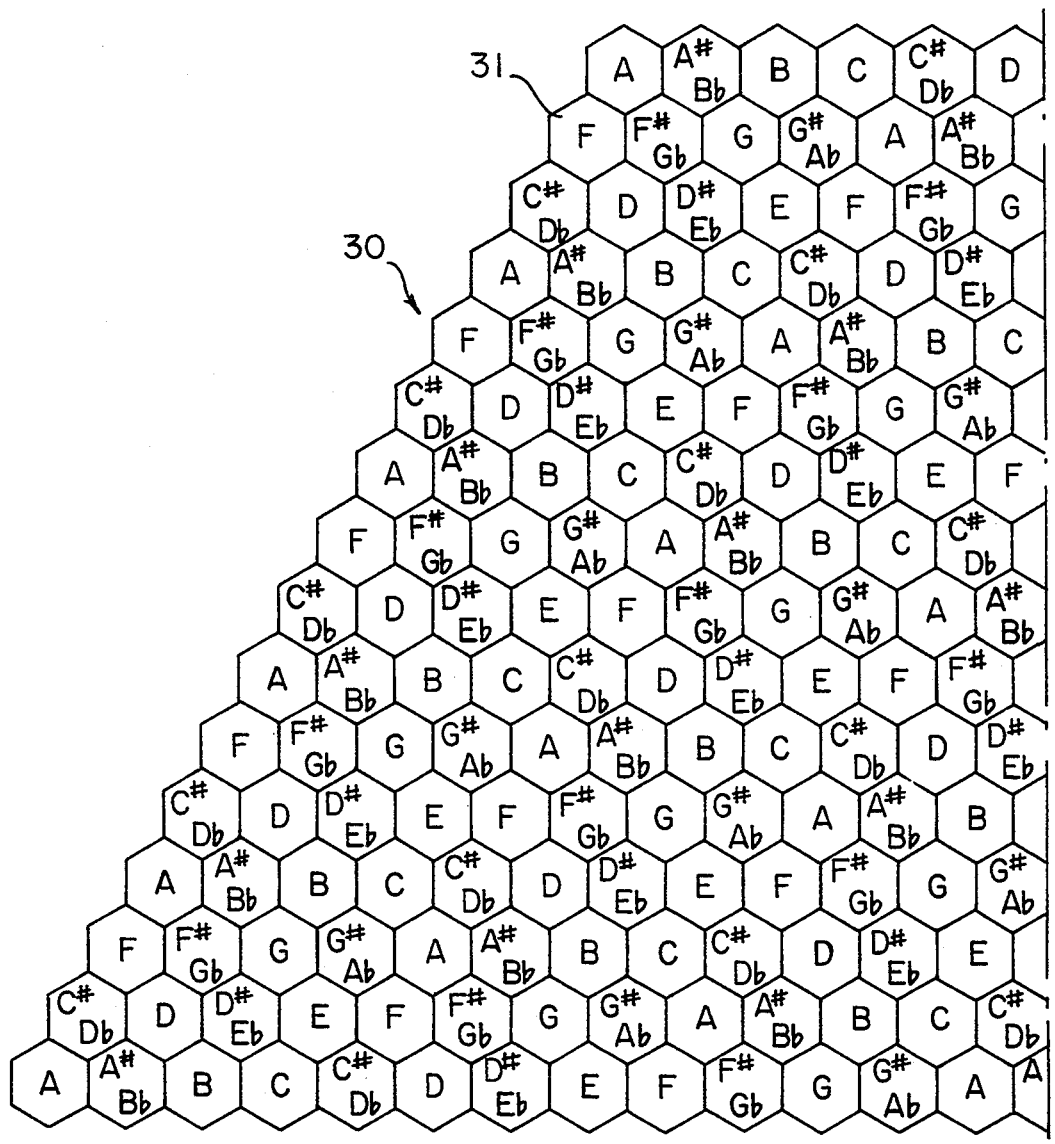
FIGS. 7A, 7B, 7C and 8, show two embodiments of a keyboard of a musical instrument, to which the array, in FIGS. 1 to 6, has been applied.
Figure 7B:
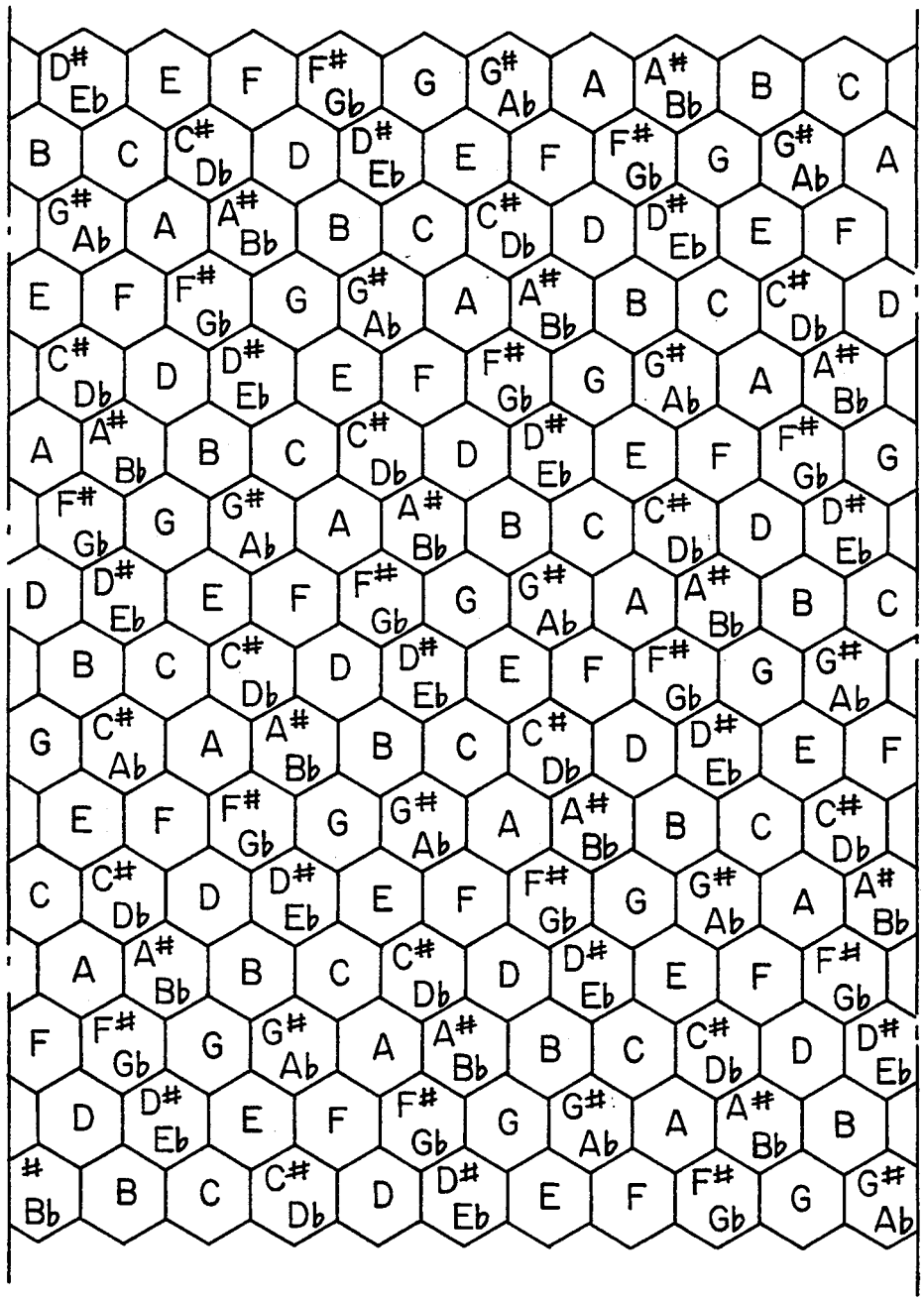
Figure 7C:
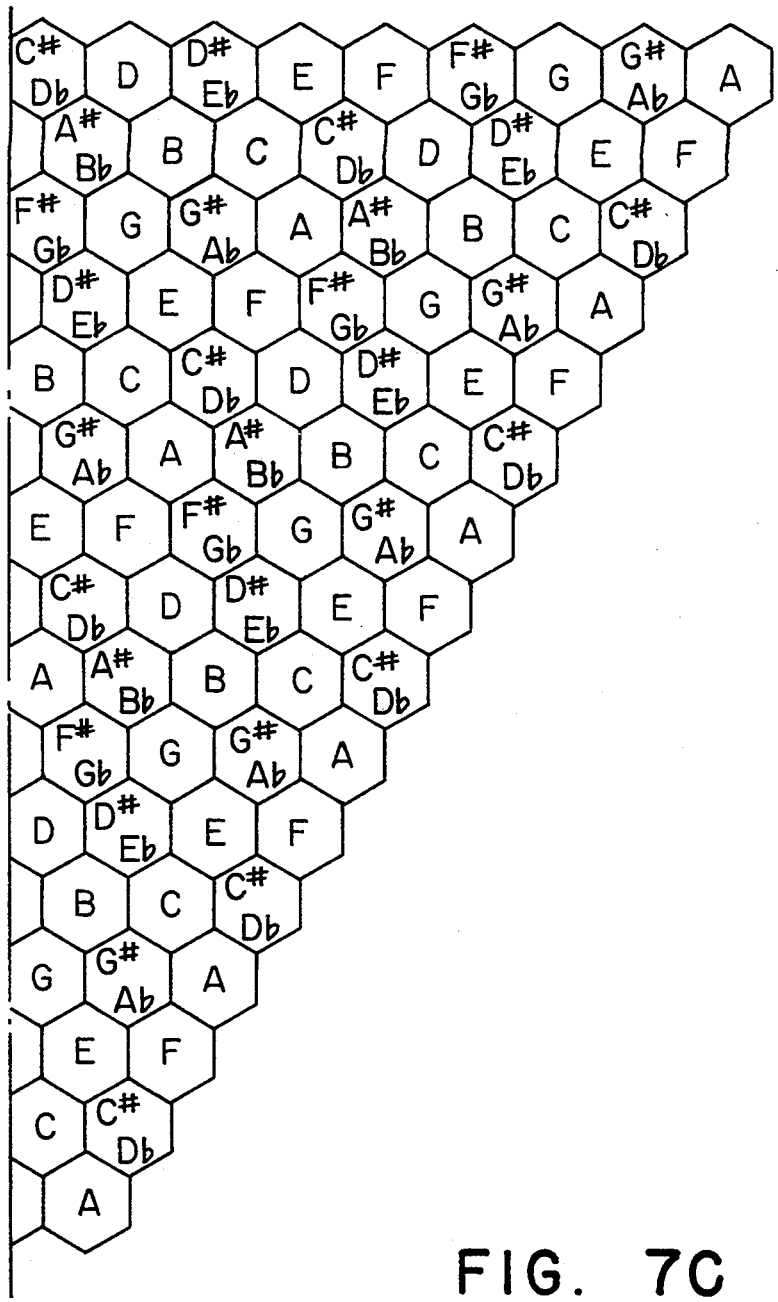

The keyboard shown generally at 30 in FIGS. 7A–7C has several horizontal rows of contact positions, in the form of keys, such as at 31, with each key being capable of being used to produce a separate audible note, and the notes being arranged by pitch in a series of semitones, in the same arrangement as the symbols of the array shown in FIGS. 1 to 6. The keys are each hexagonal in shape, to produce the staggered arrangement within the array, and form to sets of crossing diagonal rows, one of minor thirds and one of major thirds. This arrangement thus determines all intervals, chords, scales, etc. which each form a particular usual configuration in all musical keys in the same way as shown in FIGS. 1 to 6, which is not possible on a conventional keyboard. Furthermore, because each configuration of the keys on the keyboard is the same for each chord, scale, etc in all musical keys, the arrangement of notes on the keyboard also enables all scales, chords, etc and even melodies, to be played in all twelve keys without altering the fingering pattern for each key, thus enabling the player to modulate through the keys far more easily. Furthermore, the player may play equally well from any position around the instrument.

A seven octave expanded keyboard can have sixteen rows and, by the present invention, can be smaller in overall size than a conventional keyboard instrument. Larger and smaller versions, with differing numbers of keys, can be produced, and the shapes of the keys can be other than hexagonal, for example circular, without altering their alignment with each other. The sound can be reproduced in the same way as on any conventional or other electronic keyboard or synthesizer.

Figure 8:
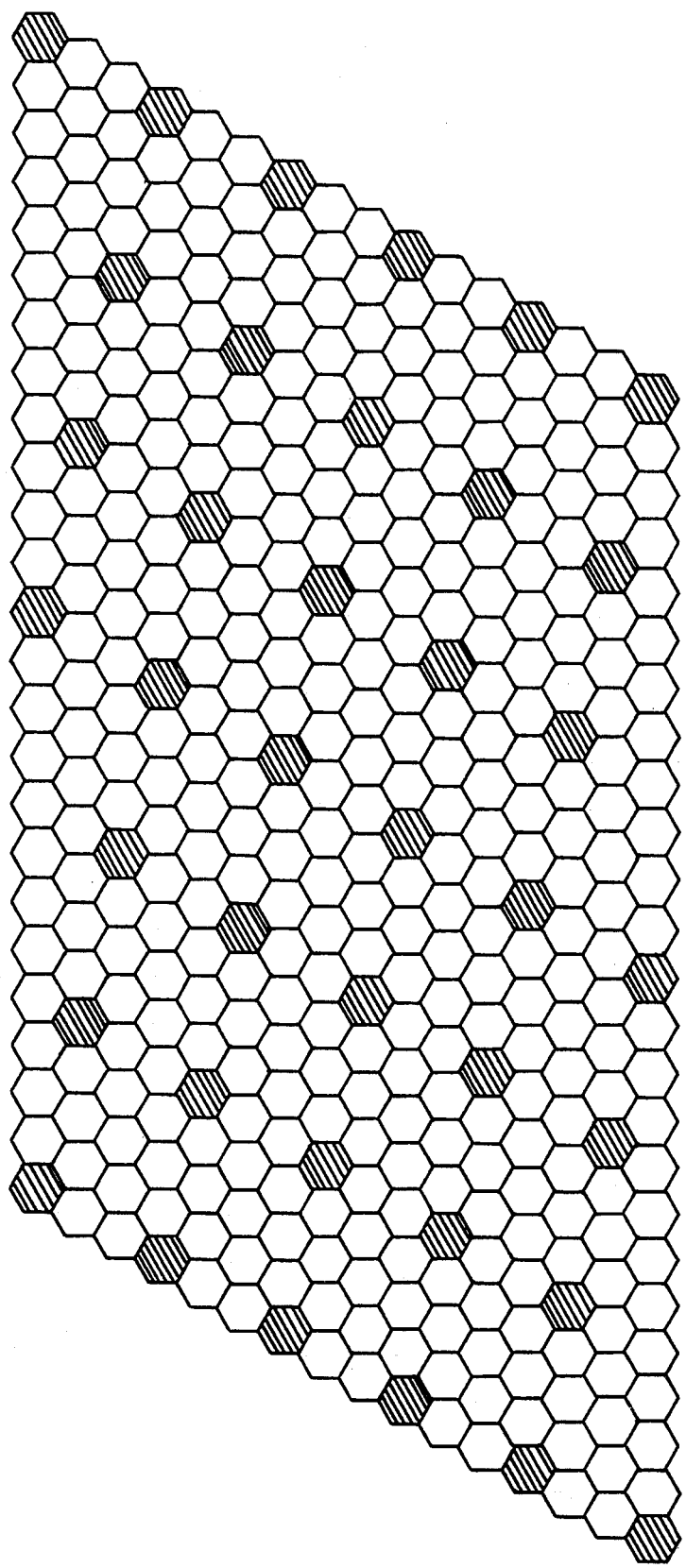
Figure 8A:
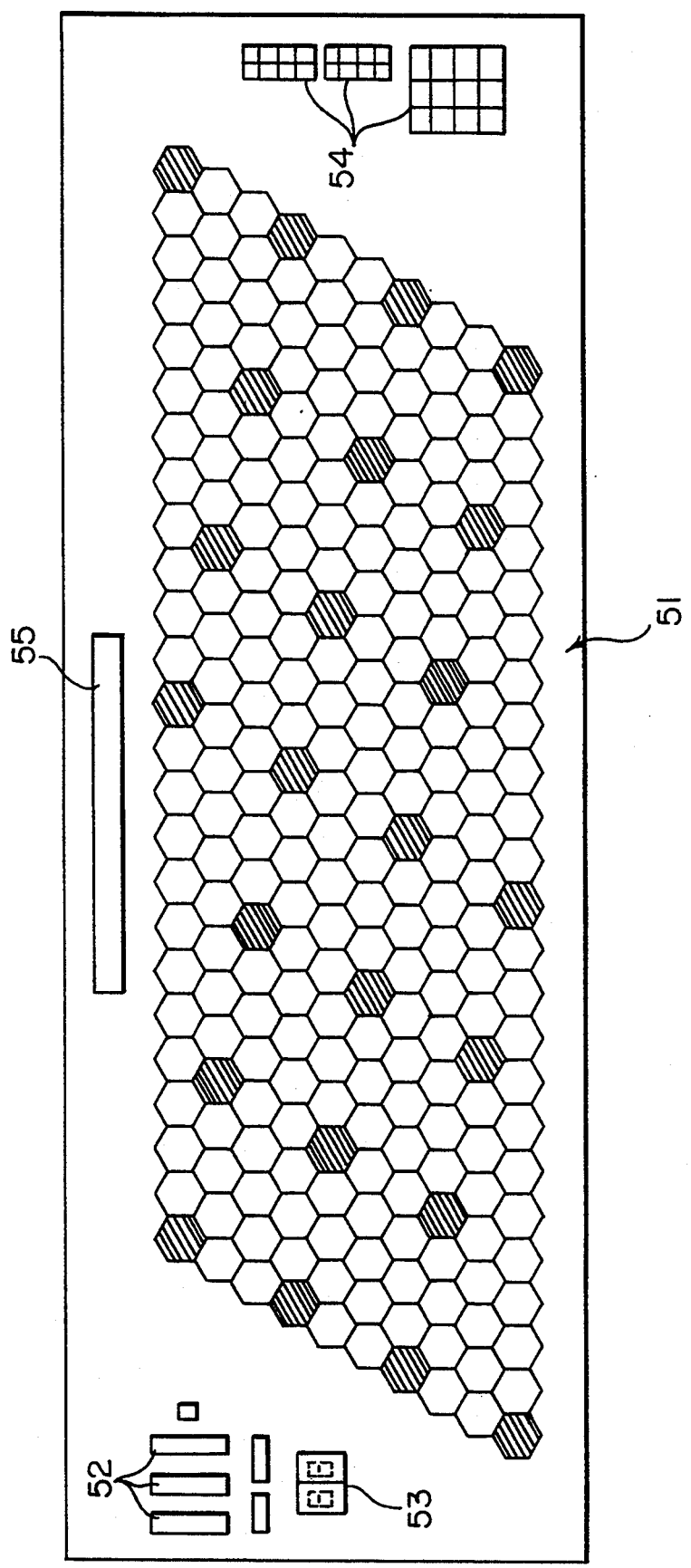
FIG. 8a shows a keyboard instrument incorporating the keyboard shown in FIG. 8, FIGS. 9A, 9B and 10 to 12 show three embodiments of a fingerboard of a guitar, to which the array, in FIGS. 1 to 6, has been applied.

Rather than labelling each key as shown in FIG. 7 to indicate the positioning of the notes, it may be preferable to show the notes as black or white as on a conventional piano keyboard. One particular example is shown in FIG. 8, wherein the keys of the keyboard has been coloured black or white to show octaves and unisons. Alternatively, all shards and flats may be coloured with the remaining keys white, as in conventional piano keyboards. FIG. 8a shows an example of an electronic keyboard instrument including a keyboard 51, in accordance with the keyboard shown in FIG. 8, and a number of control switches or buttons 52, an L.E.D. 53, a number of control key pads 54 and a back-lit L.C.D. 55 arranged around the keyboard 51. The instrument in this example may have a five octave range and can be worn with a shoulder strap or be placed on a stand. A suitable standard interface (not shown) may be used to connect the instrument with other sound modules, etc. There may also be a facility for a built-in system of key matrix connection, whereby each key of the keyboard will have a unique code.

FIGS. 9A, 9B, and 10 to 12 show different embodiments of a fingerboard of a guitar, to which the array, as shown in FIGS. 1 to 6 has been applied. FIG. 9 illustrates the position of the notes and FIGS. 10 to 12 illustrate three examples of different embodiments of the fingerboard.

It can be seen that the fingerboards shown in FIGS. 10 to 12 each have seven strings, which define contact positions and which are set closer together than on a conventional six stringed guitar fingerboard. This number of strings gives the guitar, in accordance with the invention, the same pitch range (approximately four octaves) as a conventional guitar, because the interval from string to string is shorter. In order to create an arrangement of notes, in accordance with the array (where each note is at the centre of three crossing rows of notes), contact positions at the semi-tone intervals for each string are midway between contact positions on the neighbouring strings. The fingerboard 32 in FIG. 10 has frets 33, which slant at predetermined angles relative to the strings, to provide the contact positions along the strings to obtain the arrangement of the array. Two different embodiments to this are shown in FIGS. 11 and 12. In FIG. 11, fingerboard 34 has a moulded formation 35 shaped to provide the necessary contact positions along the strings to obtain the array. In FIG. 12, fingerboard 36 is provided with studs 37, which provide the contact positions along the strings and each consist of a section of metal rod set into and protruding from holes in the fingerboard and shaded in such a way that the string can be precisely stopped on it, as well as being pushed or pulled sideways onto another protruding stud. A nut 38 is shaped so as to set up the staggered contact positions. The nut is divided to produce one scale length for the first, third, fifth and seventh strings and another scale length, half a fret space shorter, for the second, fourth and sixth strings.

Figure 13:
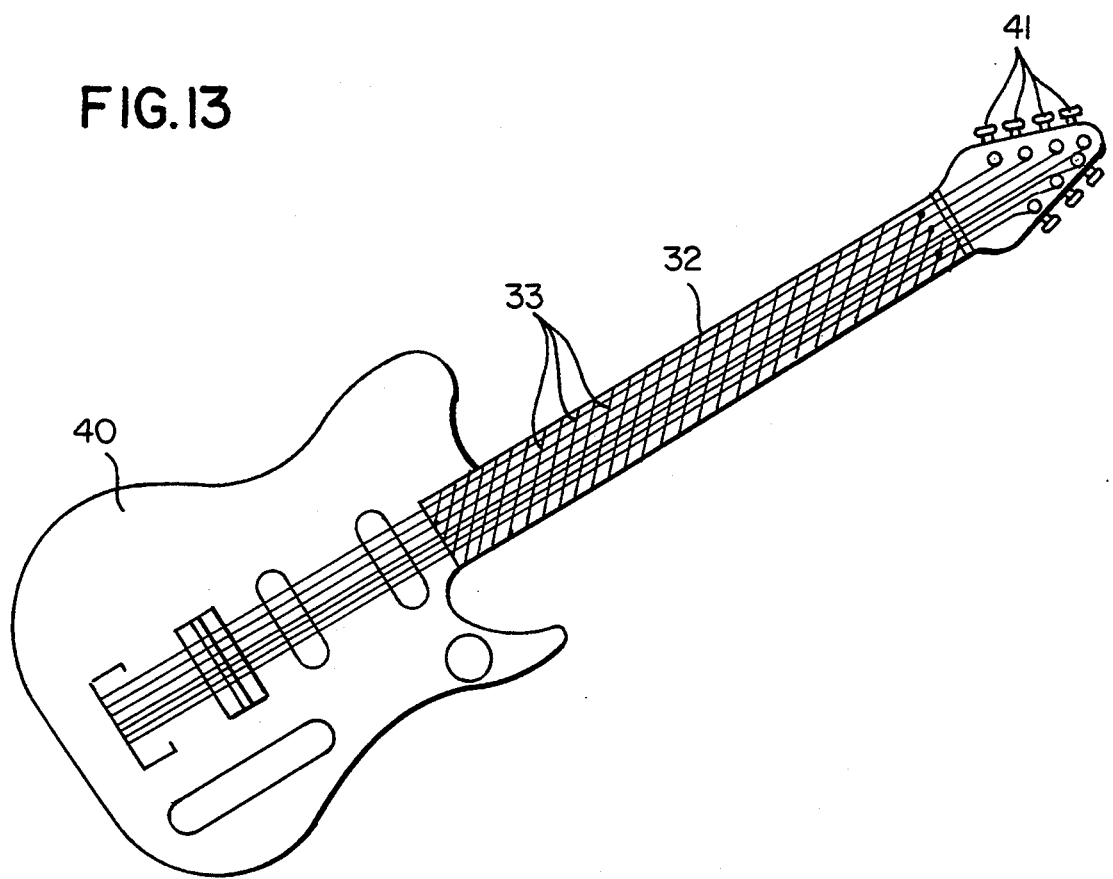
FIG. 13 shows schematically a complete guitar having a fingerboard in accordance with that shown in FIG. 10, FIGS. 14 to 18 show four embodiments of a fingerboard of a bass, to which the array in FIGS. 1 to 6 has been applied.

FIG. 13 shows schematically an electric guitar having a body 40 and a neck with a fingerboard 32. The fingerboard is the same arrangement as that shown in FIG. 10 with slanting frets 33 and seven strings tensioned across the frets. The end of the neck is provided with a headstock carrying tuning pegs 41, for adjusting the tension of the strings. Alternatively, these may be mounted on the body end of the instrument in a way similar to existing 'headless' guitars and basses.

The neck width and scale length of each embodiment of the fingerboard can be similar to conventional guitars thus giving the instruments of the present invention a familiar feel to players of conventional guitars. The staggered arrangement of notes from string to string provides more finger room in spite of the closer spacing of the strings, and also enables the player to hold down a major triad with one finger. A slight backward movement of the same finger on the fingerboard will change it to the minor triad. Two fingers laid across the fingerboard can hold down a seven note chord and the playing of any diagonal rows produces diminished and augmented chords. All chords and single note passages can be played with the same finger positions throughout, without the alteration necessary on conventional guitars when allowing for the (differently tuned) third string.

Figures 14A, 14B:
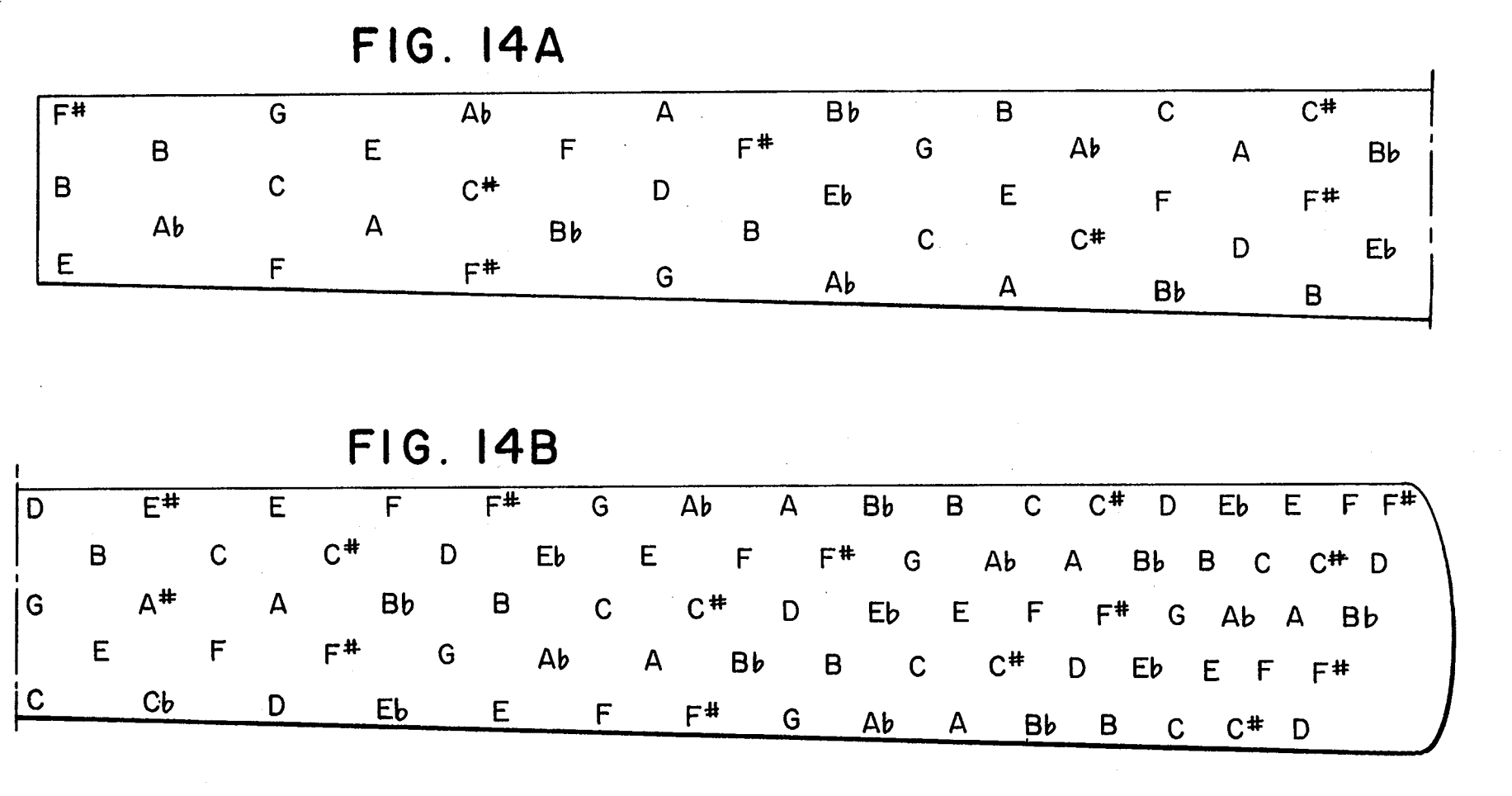
Figure 15:
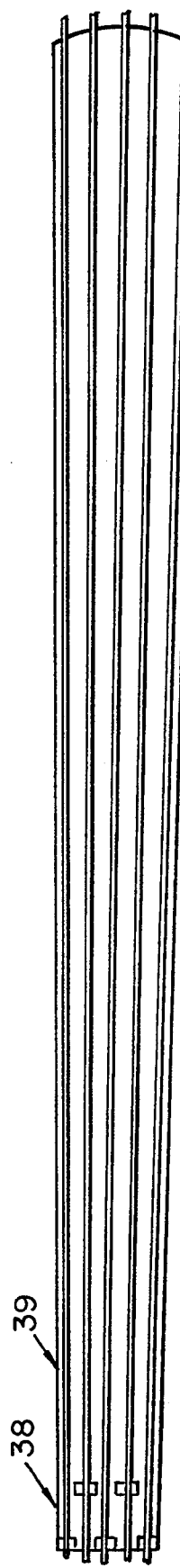
Figure 16:
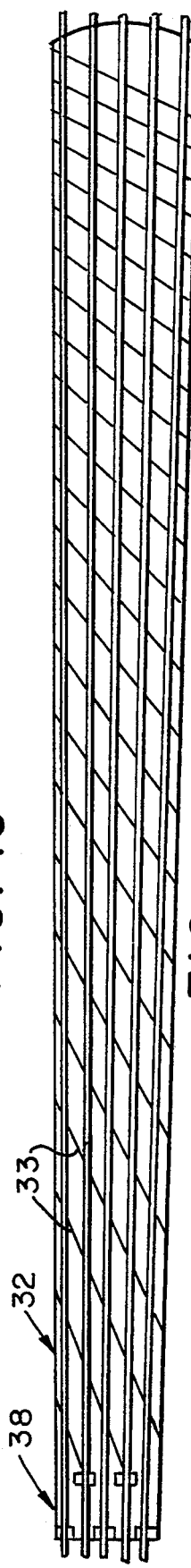
Figure 17:
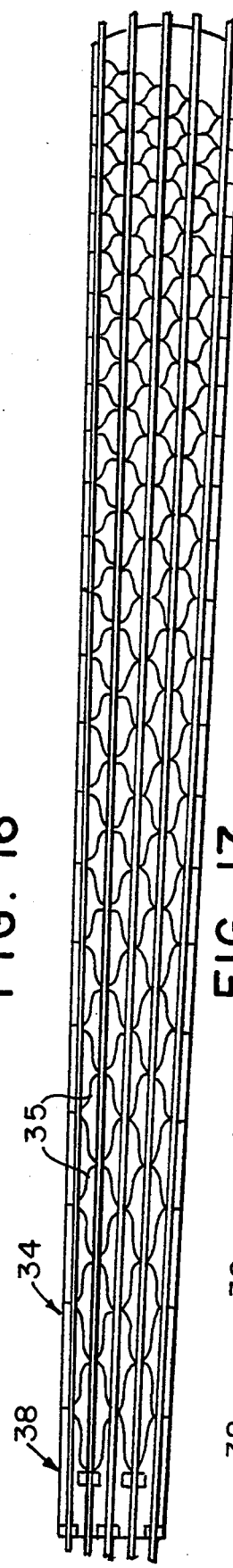

As shown in FIGS. 14 to 16, the array may be applied in a similar manner to the fingerboard of a bass, rather than a guitar. In these embodiments, the fingerboards have only five strings and, in addition, as shown in FIG. 15, a fretless bass fingerboard 39 may be used.

According to another emDodiment of the present invention, there is provided a device comprising two overlapping members slidably movable relative to each other, one of the members having an array of symbols each representing a musical note and being arranged in accordance with the second aspect of the present invention, and the other member being arranged to indicate on the array each musical note relationship in different musical keys as the members are slidably moved relative to each other.

Figure 18:
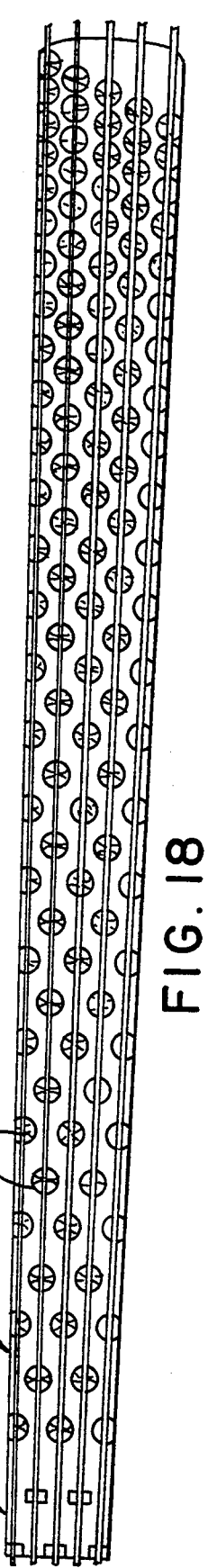
FIGS. 18a to 18c show parts of a device, in accordance with another embodiment of the invention, in the form of a slide rule.
Figure 18A:
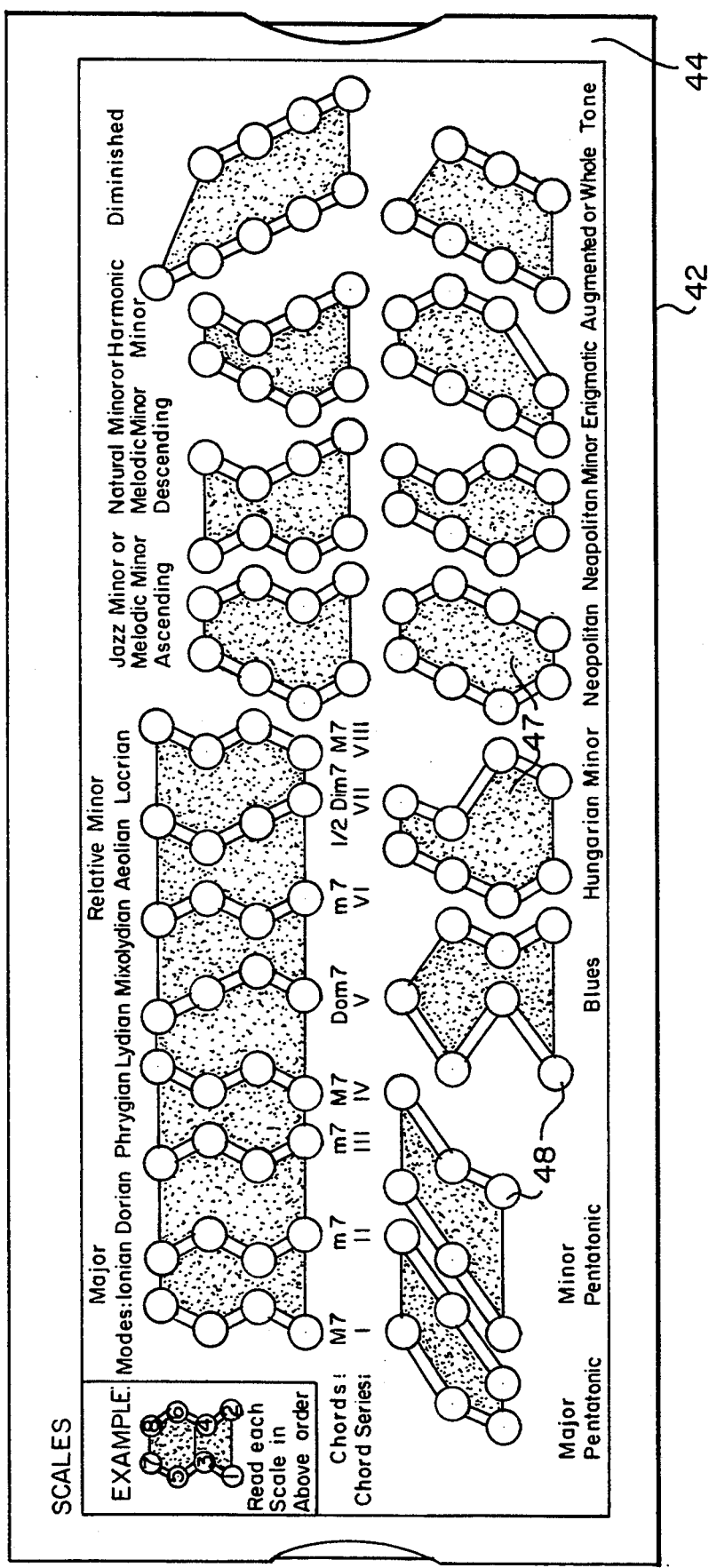
Figure 18B:
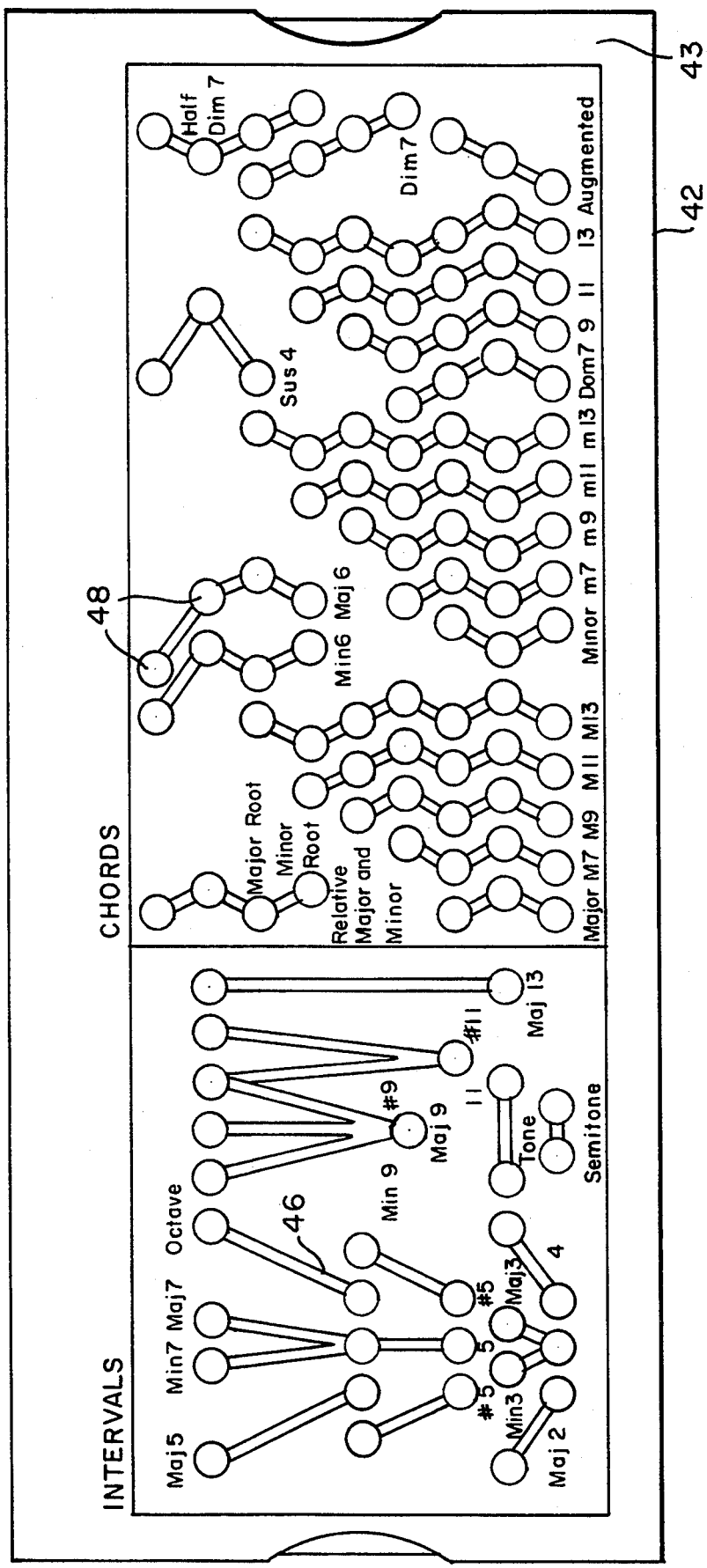
Figure 18C:
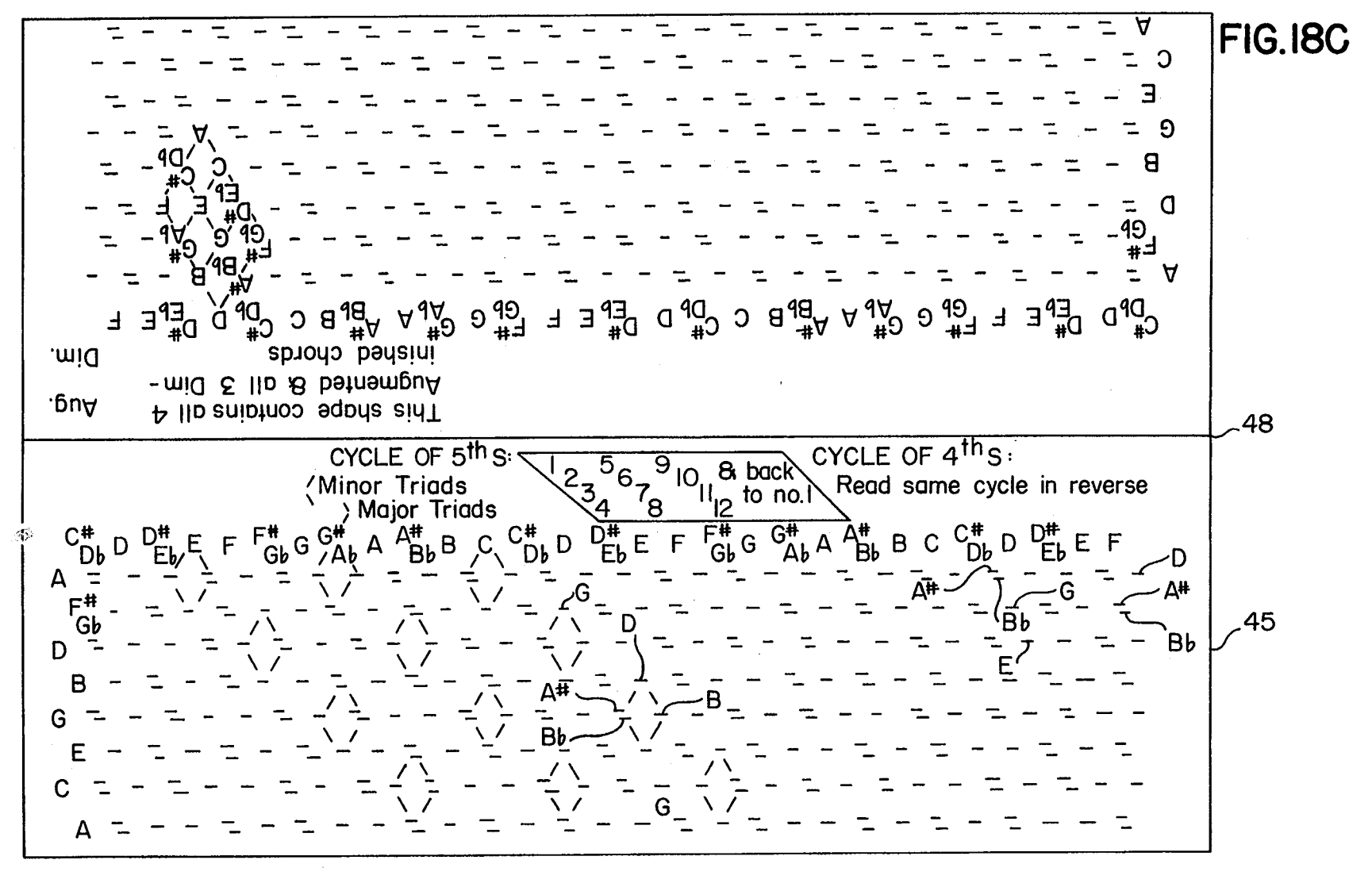

Referring now to FIGS. 18a to 18c, there is shown a slide rule device including an outer sleeve 42, which acts as a cursor, having two opposite sides 43, 44, within which the inner member 45 can be slid. The slide rule provides a reference to the musical note content, in any key, of intervals, of varying types of chords, and of scales, including the modes of the major scale. The outer sleeve 42 carries connecting bands such as at 46 to indicate intervals and chords, and block shapes such as 47 to indicate scales and modes. The inner member 45 is folded along line 48 before insertion into the sleeve 42 and each side of the folded inner member 45 carries the array of musical notes as shown in FIGS. 1 to 6. Also marked on this member are connecting bands to indicate a useful chord progression, the "cycle of fifths" and a shade indicating augmented and diminished chords. These markings are visible only when the inner member is removed from the outer sleeve. The outer sleeve 42 is formed on each side with holes or transparent windows, such as those shown at 48, through which the notes of the array on the inner member 45 are visible, as shown in FIGS. 18a and 18b. The notes visible through the holes or windows are thus changed as the inner member 45 is slid within the sleeve 42.

Figure 19:
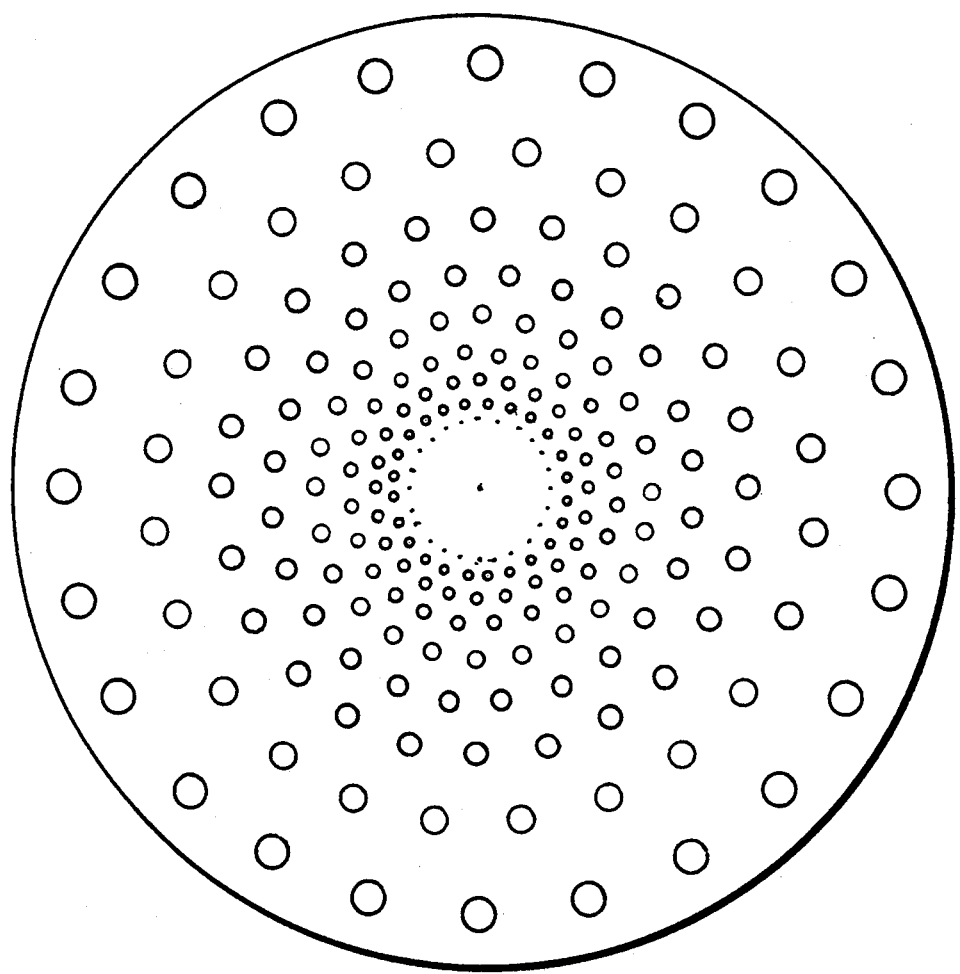
FIG. 19 shows schematically another example of a device as shown in FIGS. 18a to 18c, and FIGS. 20 to 23 show schematically four further examples of keyboards incorporating the present invention.

The slide rule can also be made in a disc form, with the array of notes in a pattern such as is shown schematically in FIG. 19, wherein each row of semitones follows a circular path.

Other possible forms for slide rules based on the same array include three dimensional ones such as prismatic, cylindrical and conical.

Figure 20:
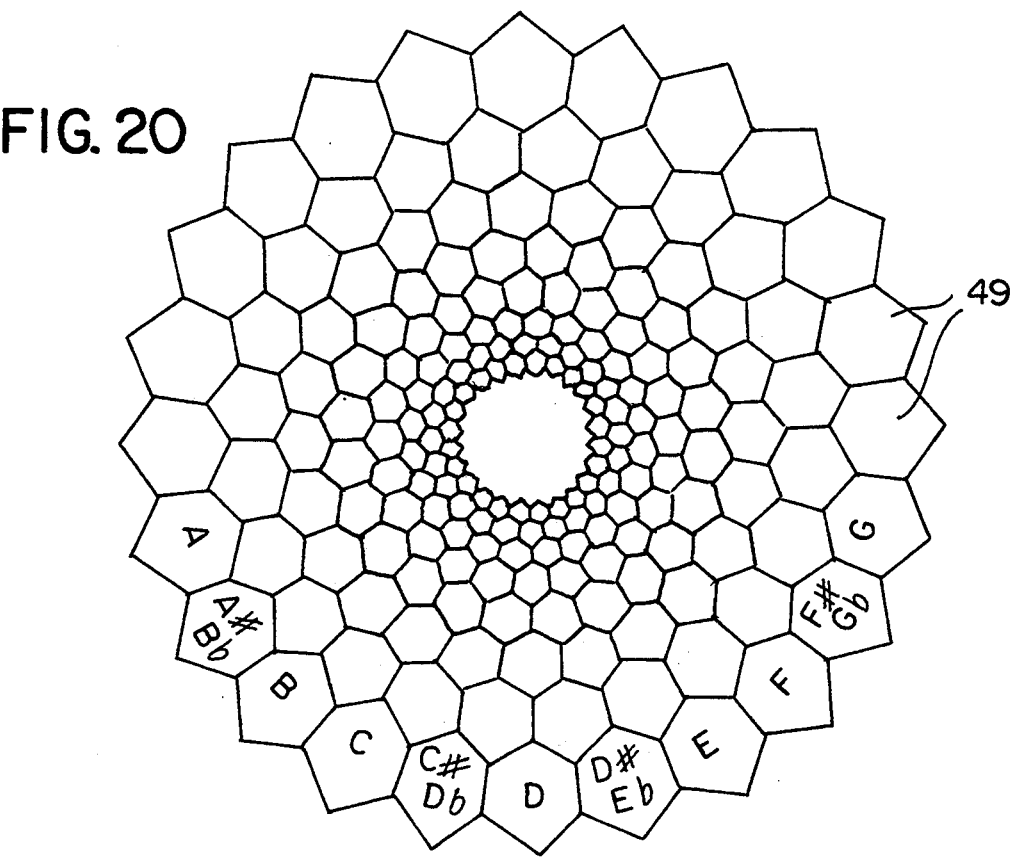
Figure 21:
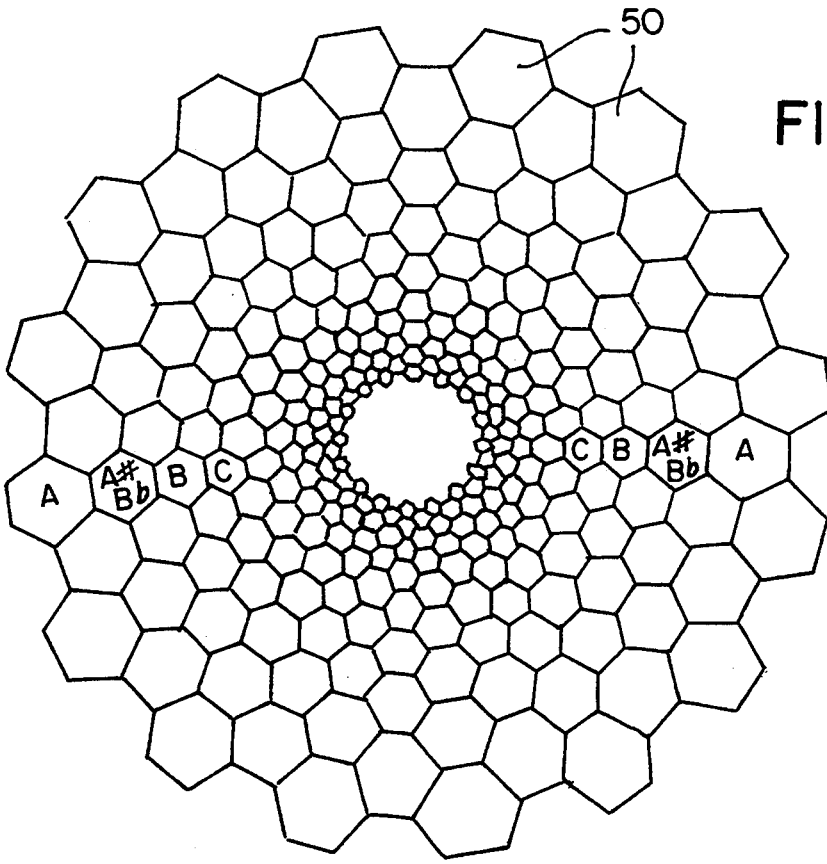

Whilst particular embodiments of the present invention have been described, various modifications may also be envisaged without departure from the scope of the invention. For example, the array may be formed by vertical, rather than horizontal, lines. The lines of semitones may be curved instead of straight, and can even form concentric circles or semicircles. FIG. 20 shows a circular keyboard with concentric circles of hexagonal keys 49. The relationship between musical notes from one circle to the next is the same as that described for the keyboard with straight rows of semitones. Any degree of curvature is possible, from none at all to slight or extreme FIG. 21 shows another circular keyboard with the rows of hexagonal keys 50 arranged in straight lines forming the radii of a circle. The fingering of such an instrument would be reversed from the left hand to the right hand, and if the hands were then crossed, the music itself would be harmonically reversed, e.g. a low note to a high note would become high to low. It may also be applied to many other musical instruments, such as the Chapman stick, lute, mandolin, banjo, accordion, violin and viola, as well as synthesizers and controllers of sound-generating modules, of any shape or size, which may have keys of any shape or size and may be floor standing or supported by a strap worn by the player like a guitar. Any form of the array may also be incorporated into an existing instrument or offered in combination with a conventional instrument. Also kits and accessories may be provided to adapt conventional musical instruments to those, in accordance with the present invention.

Figure 22:
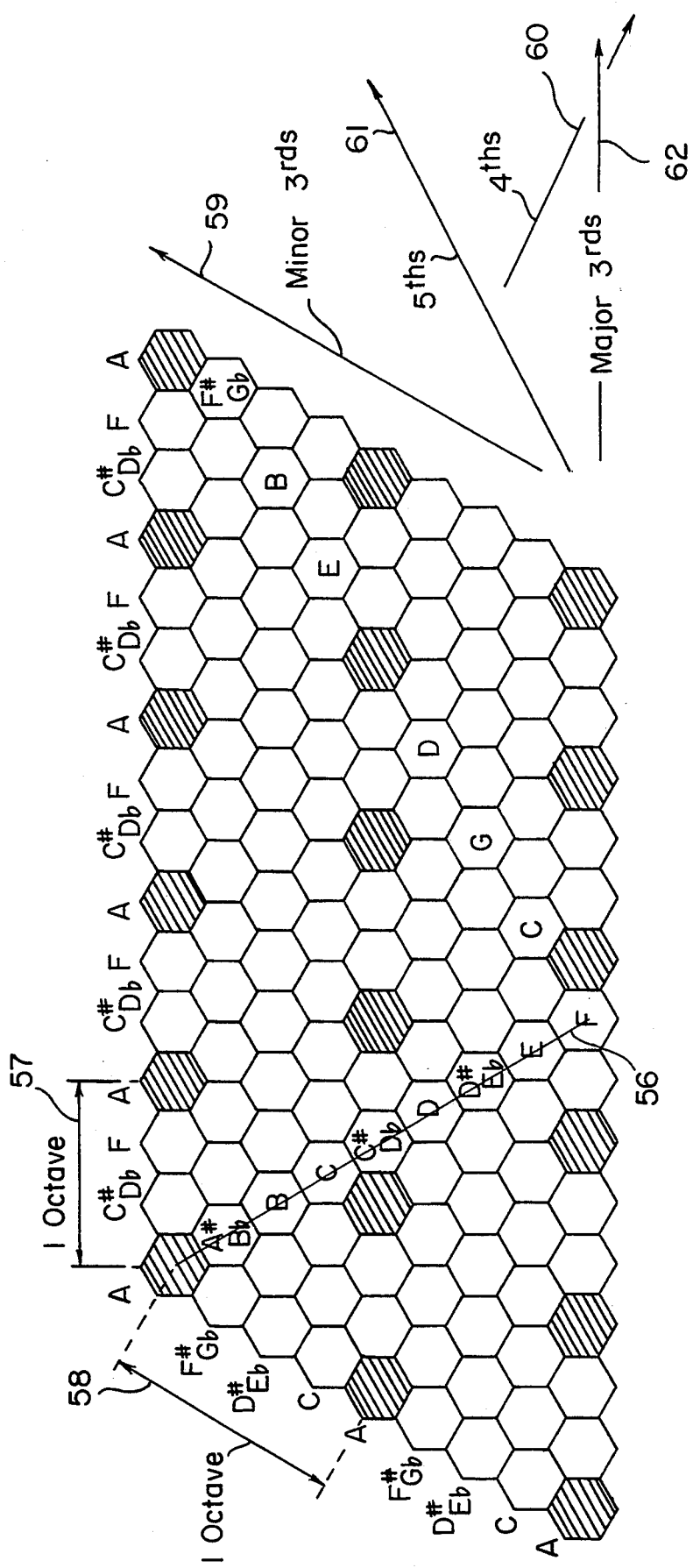
Figure 23:
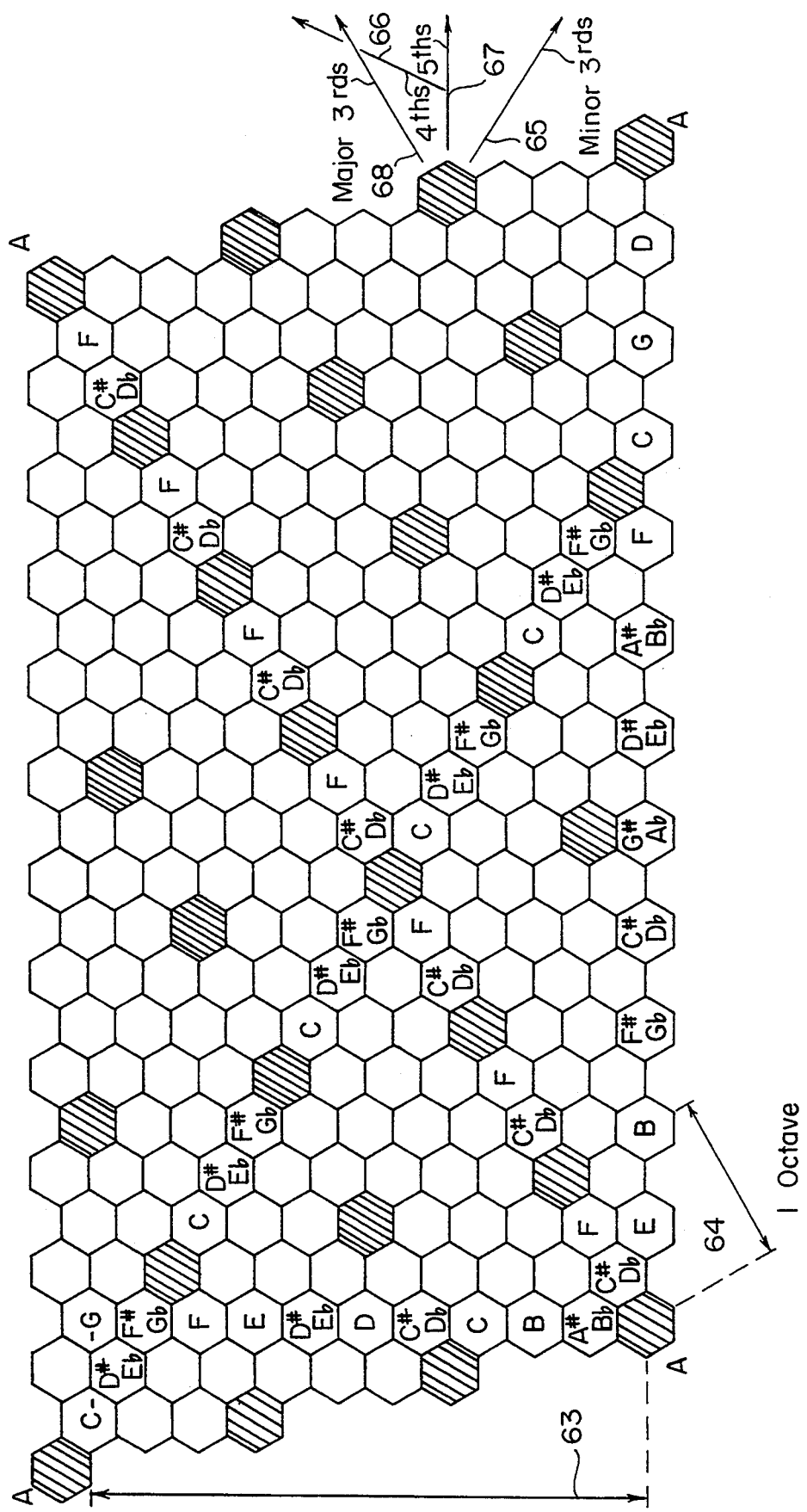

FIG. 22 shows another example comprising a seven octave keyboard wherein all the "A" keys are shaded and with the lines of semi-tones, such as the one shown at 56, being rotated 60° anti-clockwise with respect to the horizontal lines shown for example in FIG. 8. This arrangement thus produces octaves, such as at 57 and 58, minor 3rds as at 59, 4ths as at 60, 5ths as at 61, and major 3rds as at 62. FIG. 23 shows yet another example of a seven octave keyboard, again with all "A" keys shaded, but with the lines of semi-tones, such as the one shown at 63, rotated 90° anti-clockwise and turned upside down so that the semi-tones increase in pitch from the bottom of the keyboard upwards. This then produces octaves, such as at 64, minor 3rds as at 65, 4ths as at 66, 5ths as at 67, and major 3rds as at 68.

Furthermore, the symbols arranged to produce the array may take the form of any visual representation, which can be used to represent different musical notes. For example, the symbols may consist of different colours, letters, numbers or any other design.

I claim:

1. A device for producing musical note relationships including first and second overlapping members movable relative to each other, said first member bearing an array of symbols, each symbol representing a musical note and the array consisting of rows of said symbols, any given row being arranged relative to an adjacent row such that successive symbols of said given row each lie substantially between two successive symbols of said adjacent row, said successive symbols of each row representing the musical notes of a chromatic scale wherein, for each symbol in said given row which lies substantially between two successive symbols of said adjacent row, the two successive symbols represent notes which form musical intervals with the note represented by said symbol of a major third and a minor third respectively, said second member having a plurality of windows formed therein through which symbols on said first member are visible, said windows being formed in said second member in groups of different configurations, said groups being positioned and arranged relative to the symbols on said first member such that different ones of said groups produce visual representations of different musical note relationships including scales, chords, intervals and modes, which are all directly identifiable from said device, and by moving said first and second members relative to each other, for any given group of windows, the same musical note relationship in different musical keys is visible through the windows of said group.

2. A device as claimed in claim 1, wherein said second member comprises an outer sleeve within which said first member is slidable.

3. A device as claimed in claim 2, wherein windows are formed on both sides of said sleeve and said first member bears said array on both sides thereof.

4. A device as claimed in claim 1, wherein said first and second members are disc-shaped, and are rotatable relative to each other, said symbols of said array being arranged in concentric circular rows on said first member.

* * * * *